United States Patent [19]

Matsumoto et al.

[11] Patent Number: 5,037,073
[45] Date of Patent: Aug. 6, 1991

[54] FLUID-FILLED CYLINDRICAL ELASTIC MOUNT HAVING MOVEABLE BLOCK AND SPIRAL ORIFICE

[75] Inventors: Nobuo Matsumoto, Nagoya; Keita Shiraki, Kasugai, both of Japan

[73] Assignees: Tokai Rubber Industries Ltd.; Toyota Jidosha Kabushiki Kaisha, both of Aichi, Japan

[21] Appl. No.: 536,090

[22] Filed: Jun. 11, 1990

Related U.S. Application Data

[63] Continuation of Ser. No. 433,226, Nov. 8, 1989, abandoned.

[30] Foreign Application Priority Data

Nov. 10, 1988 [JP] Japan ................... 63-146822[U]
Nov. 11, 1988 [JP] Japan ................... 63-147851[U]

[51] Int. Cl.⁵ .................. F16F 5/00; F16F 9/00; F16F 13/00; B60K 5/12
[52] U.S. Cl. .................. 267/140.1; 180/312; 248/562; 248/636
[58] Field of Search .............. 267/140.1 R, 140.1 C, 267/219, 220, 141.2; 180/300, 312, 902; 248/562, 636

[56] References Cited

U.S. PATENT DOCUMENTS

| 4,605,207 | 8/1986 | Konishi . | |
|---|---|---|---|
| 4,667,942 | 5/1987 | Bitschkus et al. | 267/140.1 C |
| 4,693,456 | 9/1987 | Kanda . | |
| 4,728,086 | 3/1988 | Ishiyama et al. . | |
| 4,738,434 | 4/1988 | Marjoram et al. . | |
| 4,738,435 | 4/1988 | Flower et al. . | |
| 4,749,173 | 6/1988 | Kanda . | |
| 4,749,174 | 6/1988 | Kanda . | |
| 4,756,514 | 7/1988 | Kanda . | |
| 4,768,760 | 9/1988 | LeFol . | |
| 4,790,520 | 12/1988 | Tanaka et al. . | |
| 4,838,529 | 6/1989 | Orikawa et al. | 267/140.1 C |
| 4,865,299 | 9/1989 | Goto . | |
| 4,893,798 | 1/1990 | Hibi et al. | 248/562 X |
| 4,923,178 | 5/1990 | Matsumoto et al. | 267/140.1 C |

FOREIGN PATENT DOCUMENTS

| 332150 | 9/1989 | European Pat. Off. . | |
|---|---|---|---|
| 3125040 | 3/1983 | Fed. Rep. of Germany . | |
| 3502539 | 8/1985 | Fed. Rep. of Germany . | |
| 3721444 | 1/1988 | Fed. Rep. of Germany . | |
| 2551161 | 3/1985 | France . | |
| 2624235 | 6/1989 | France . | |
| 48-36151 | 11/1973 | Japan . | |
| 4836151 | 11/1973 | Japan . | |
| 52-16554 | 5/1977 | Japan . | |
| 53-5376 | 1/1978 | Japan . | |
| 55-107142 | 8/1980 | Japan . | |
| 57-9340 | 1/1982 | Japan . | |
| 579340 | 1/1982 | Japan . | |
| 6049147 | 3/1985 | Japan . | |
| 61-294235 | 6/1985 | Japan . | |
| 179542 | 9/1985 | Japan | 267/140.1 C |
| 118131 | 5/1987 | Japan | 267/140.1 C |
| 62-224746 | 10/1987 | Japan . | |
| 62-261730 | 11/1987 | Japan . | |
| 62-292941 | 12/1987 | Japan . | |
| 3339 | 1/1989 | Japan | 267/140.1 C |
| 2200190 | 7/1988 | United Kingdom . | |

OTHER PUBLICATIONS

European Patent Office Search Report No. 89104030.5, Jun. 23, 1989.
European Patent Office Search Report No. 89120908.2, May 2, 1990.

Primary Examiner—George E. A. Halvosa
Attorney, Agent, or Firm—Oliff & Berridge

[57] ABSTRACT

A fluid-filled cylindrical elastic mount having an elastic body between an inner and an outer sleeve, a movable member movably disposed in a pressure-receiving chamber defined by the outer sleeve and the elastic body, a rigid member cooperating with the outer sleeve to define a space diametrically opposite to the pressure-receiving chamber in a load-receiving direction of the mount, and a partition member having a flexible portion and dividing the space into two sections one of which serves as an equilibrium chamber disposed diametrically opposite to the pressure-receiving chamber. The movable member and the inner surface of the pressure-receiving portion define a fluid resonance portion for isolating high-frequency vibrations. An orifice passage is spirally formed for fluid communication between the pressure-receiving and equilibrium chambers, for damping low-frequency vibrations.

12 Claims, 8 Drawing Sheets

FLUID-FILLED CYLINDRICAL ELASTIC MOUNT HAVING MOVEABLE BLOCK AND SPIRAL ORIFICE

This is a continuation of application Ser. No. 07/433,226 filed Nov. 8, 1989, now abandoned.

BACKGROUND OF THE INVENTION

1. Field of the Invention

The present invention relates in general to a fluid-filled cylindrical elastic mount capable of reducing the amount of transmission of vibrations, based on flows of a fluid contained therein. More particularly, the invention is concerned with a simplified structure of a fluid-filled cylindrical elastic mount capable of effectively damping input vibrations having relatively low frequencies, and exhibiting a sufficiently low dynamic spring constant with respect to input vibrations having high frequencies.

2. Discussion of the Prior Art

A cylindrical elastic mount such as a suspension bushing or engine mount used on a motor vehicle is known as a device for elastically or flexibly connecting two members in a vibration system in a vibration damping or isolating manner, or as a device for mounting one of the two members on the other member such that the one member is elastically or flexibly supported by the other member. Such a cylindrical elastic mount has an inner and an outer sleeve which are made of a metallic material and are disposed in radially spaced-apart, coaxial or non-coaxial relationship with each other. Between these inner and outer sleeves, there is interposed an elastic body such as a formed rubber mass, such that the two sleeves are elastically connected by the elastic body.

The elastic mount of the type indicated above is generally required to provide an excellent vibration damping effect with respect to low-frequency vibrations, and exhibit a sufficiently low dynamic spring rate or constant with respect to high-frequency vibrations. Conventionally, the elasticity or elastic deformation or displacement of the elastic body is primarily relied upon to meet these two requirements concerning the vibration damping and/or isolating characteristics. However, the conventional elastic mount suffers from considerable difficulty in meeting the requirements, particularly the requirement for providing a satisfactory effect of damping the low-frequency vibrations.

In view of the above drawback of the conventional cylindrical elastic mount, a so-called fluid-filled mount has been recently proposed, as disclosed in Publication Nos. 48-36151 and 52-16554 of examined Japanese Patent Applications. A fluid-filled elastic mount as disclosed in these publications has two fluid chambers which are partially defined by an elastic body and are spaced apart from each other in a radial direction of the mount in which vibrations are received. The two fluid chambers are held in fluid communication with each other through a suitable orifice passage, so that the input vibrations having relatively low frequencies may be effectively damped by resonance of a fluid flowing through the orifice passage. The fluid flow is induced due to elastic deformation of the elastic body upon application of the vibrations to the fluid-filled elastic mount.

In the fluid-filled elastic mount indicated above, the orifice passage for causing the fluid resonance is tuned so as to provide excellent damping characteristic for the vibrations having relatively low frequencies. However, the elastic mount also receives vibrations whose frequencies are higher than those of the excellently damped vibrations. When the frequency range of the vibrations received by the elastic mount is higher than the tuned frequency range of the orifice passage, substantially no flows of the fluid through the orifice passage occurs, or the orifice acts as if it were closed. In this case, therefore, the fluid-filled elastic mount exhibits a considerably high dynamic spring constant, and tends to undesirably suffer from deteriorated characteristics for isolating the high-frequency vibrations.

To overcome the above problem, it is proposed to suitably lower the dynamic spring constant of the fluid-filled elastic mount, by employing a mechanism which includes an oscillating plate for absorbing the pressure of the fluid when the vibrations having relatively high frequencies are applied to the elastic mount. Examples of fluid-filled vibration isolating devices incorporating such a mechanism are shown in laid-open Publication Nos. 53-5376 and 57-9340 of unexamined Japanese Patent Applications. However, the use of the fluid pressure absorbing mechanism indicated above for the fluid-filled cylindrical elastic mount necessarily complicates the structure of the mount, and results in an increase in the cost of manufacture of the mount, thereby making it difficult to adopt the mechanism from the economical point of view.

SUMMARY OF THE INVENTION

The present invention was made in the light of the problems encountered in the prior art as addressed above. It is therefore an object of the present invention to provide a simply constructed fluid-filled cylindrical elastic mount capable of effectively damping and/or isolating input vibrations over a wide range of frequency of the vibrations, providing a high damping effect with respect to the vibrations of relatively low frequencies, while at the same time exhibiting an effectively low dynamic spring constant with respect to the vibrations of relatively high frequencies.

The above object of the present invention may be achieved according to the principle of the present invention, which provides a fluid-filled cylindrical elastic mount comprising (a) an inner and an outer sleeve which are disposed in spaced-apart relation with each other in a radial direction of the mount; (b) an elastic body interposed between the inner and outer sleeve for flexible connection therebetween, and having a pocket open in an outer surface thereof and an axial void formed therethrough over an entire length thereof in an axial direction the mount, the pocket and the axial void being formed in respective diametrically opposite portions of the elastic body which are opposite to each other in a load-receiving direction in which the mount primarily receives a vibrational load, the elastic body and the outer sleeve at least partially defining a pressure-receiving chamber such that the pocket is closed by the outer sleeve, the pressure-receiving chamber being filled with a non-compressible fluid, whose pressure varies upon application of the vibrational load to the mount; (c) a movable member accommodated in the pressure-receiving chamber freely movably over a predetermined distance in the load-receiving direction, the movable member defining a fluid resonance portion with respect to an inner surface of the pressure-receiving portion; (d) a rigid member disposed in the axial void, fixedly to the outer sleeve, and cooperating with the outer sleeve to define a space therebetween; (e) a partition member disposed in the space so as to divide the space into two sections one of which acts as an equilibrium chamber filled with the non-compressible fluid, the partition member including a flexible film portion which is elastically deformable so as to change a volume of the equilibrium chamber for maintaining the fluid in the equilibrium chamber at a substantially constant pressure; and (f) an orifice-defining member disposed on the outer surface of the elastic body, and having an arcuate portion which covers at least an opening of the pocket, the arcuate portion having a spiral groove formed in an outer surface thereof, and a communication hole formed in communication with an inner end of the spiral groove and the pressure-receiving chamber. The outer sleeve closes the spiral groove, and thereby forms an orifice passage which communicates at one and thereof with the pressure-receiving chamber through the communication hole and at the other end thereof corresponding to an outer end of the spiral groove with the equilibrium chamber.

The fluid-filled cylindrical elastic mount of the present invention constructed as described above provides a high damping effect with respect to low-frequency vibrations, based on the resonance of the fluid mass flowing through the orifice passage. While the orifice passage does not effectively function to isolate high-frequency vibrations, the present elastic mount exhibits a sufficiently low dynamic spring constant and effectively isolates the high-frequency vibrations, based on the resonance of the fluid flowing through the fluid resonance portion formed in the pressure-receiving chamber. Thus, the present mount exhibits excellent damping and isolating characteristics for a wide range of frequency of the input vibrations.

In particular, it is noted that the orifice passage utilizing a spiral groove is given a sufficient length for effective damping of the vibrations having relatively low frequencies, while the dynamic spring constant of this elastic mount is lowered with respect to the vibrations having relatively high frequencies, owing to a simple mechanism which simply employs the movable block disposed in the pressure-receiving chamber so as to define the fluid resonance portion. These are the dominant features of the present elastic mount.

Further, the partition member which is at least partially formed from a flexible film is protected from excessive deformation, since the partition member is disposed in the space which is defined by the rigid member and the outer sleeve which is necessarily a rigid member. This leads to improved durability and operating reliability of the elastic mount.

The fluid-filled cylindrical elastic mount may further comprise an elastic stop secured to an inner surface of the rigid member such that the elastic stop protrudes in the axial void, in facing relation with the inner sleeve in the load-receiving direction. In this arrangement, the relative displacement of the inner and outer sleeves in the load-receiving direction is limited by the abutting contact of the elastic stop with the inner sleeve, as well as by the abutting contact of the movable member with the inner and outer sleeves. Accordingly, a member to which the mount is fixed for flexible connection with a certain support member can be effectively protected from an excessive amount of displacement. Further, an excessive amount of deformation or displacement of the elastic body of the elastic mount can be effectively avoided, whereby the durability of the mount is improved.

BRIEF DESCRIPTION OF THE DRAWINGS

The above and optional objects, features and advantages of the present invention will be better understood by reading the following detailed description of presently preferred embodiments of the invention, when considered in connection with the accompanying drawings, in which.

DETAILED DESCRIPTION OF THE PREFERRED EMBODIMENTS

Figure 1:
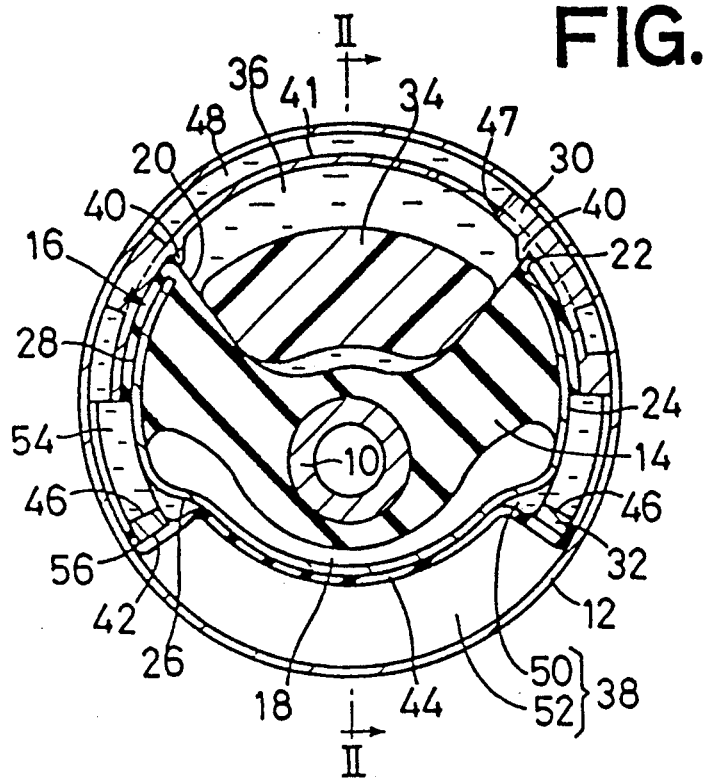
FIG. 1 is an elevational view in transverse cross section of one embodiment of a fluid-filled cylindrical elastic mount of the invention in the form of an engine mount for a motor vehicle.
Figure 2:
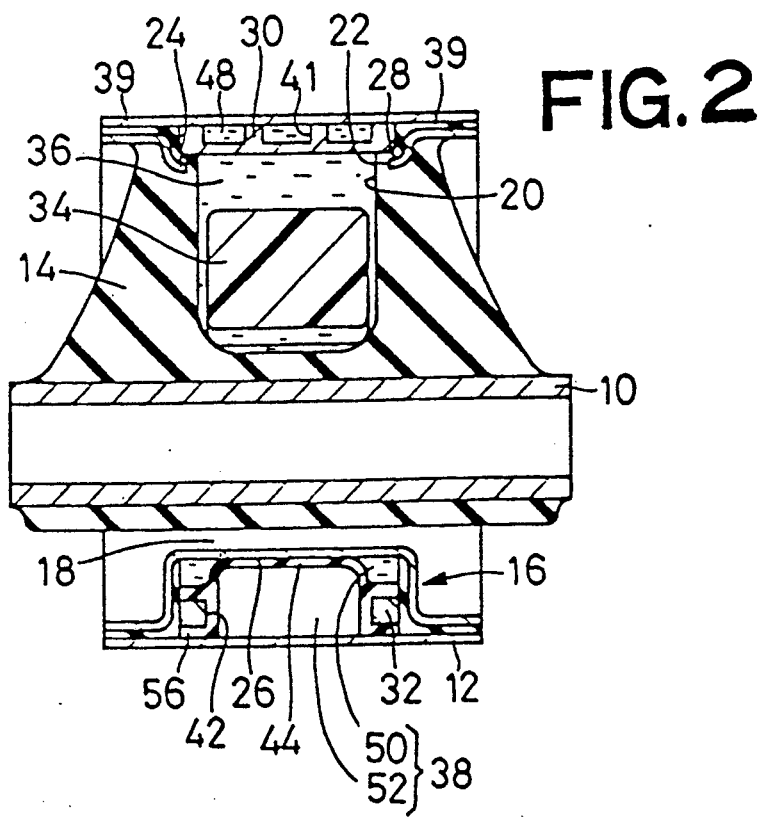
FIG. 2 is an elevational view in axial cross section taken along line II—II of FIG. 1.

Referring first to FIGS. 1 and 2, there is shown a fluid-filled cylindrical elastic engine mount adapted for use on a front-engine front-drive (F-F) car. In these figures, reference numerals 10 and 12 denote an inner and an outer sleeve 10, 12 which are made of metal and are disposed such that the two sleeves 10, 12 are eccentric with respect to each other by a predetermined distance in a diametric direction in which vibrations are primarily received by the engine mount. Between the inner and outer sleeves 10, 12, there is interposed an elastic body 14 such that the two sleeves 10, 12 are elastically connected to each other by the elastic body 14. The elastic body 14 is a generally cylindrical member formed of a suitable rubber material.

Figure 11:
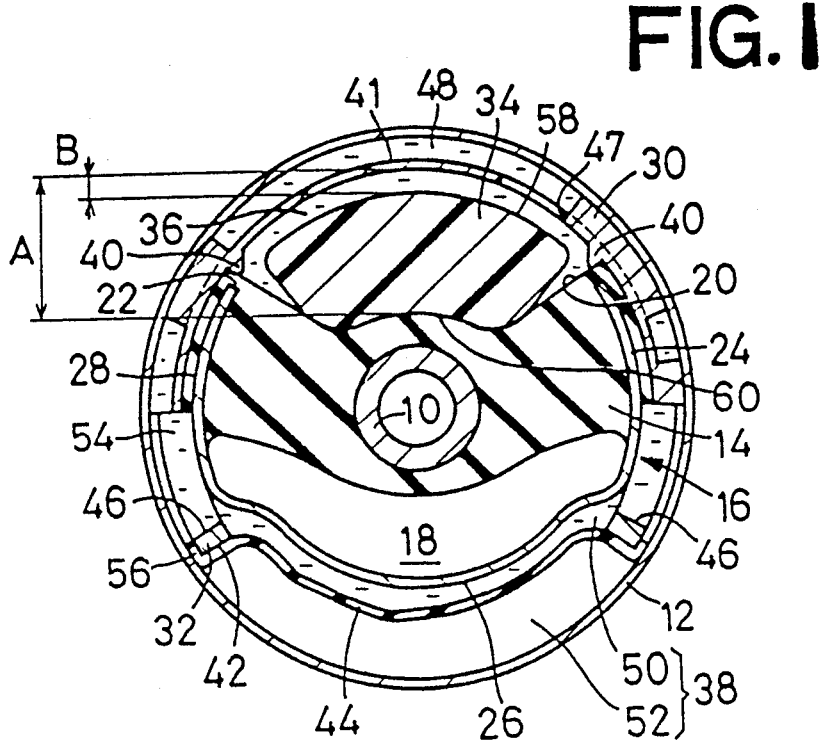
FIG. 11 a transverse cross sectional view of the engine mount of FIG. 1 when installed in position for use.

In use, the engine mount is installed on the car such that the inner sleeve 10 is connected to the body of the car while the outer sleeve 12 is fixed to a power unit which includes an engine of the car, so that the power unit is elastically or flexibly mounted on the car body via the engine mount. With the engine mount installed, the weight of the power unit acts on the outer sleeve 12, whereby the two sleeves 10, 12 are displaced relative to each other, with elastic deformation of the elastic body 14, in the diametric direction in which the two sleeves are originally eccentric with respect to each other. With the relative displacement of the inner and outer sleeves 10, 12 due to the weight of the power unit, the two sleeves 10, 12 are held in substantially coaxial or concentric relation with each other, as indicated in FIG. 11.

The present engine mount thus installed on the car is adapted to primarily damp and/or isolate vibrations which are received in the diametric direction of the mount in which the inner and outer sleeves 10, 12 are eccentrically offset from each other. This direction (vertical direction as seen in FIG. 1) is hereinafter referred to as 'load-receiving direction' of the engine mount. When the engine mount receives a vibrational load in the load-receiving direction, the elastic body 14 is elastically deformed mainly in the load-receiving direction.

Figure 3:
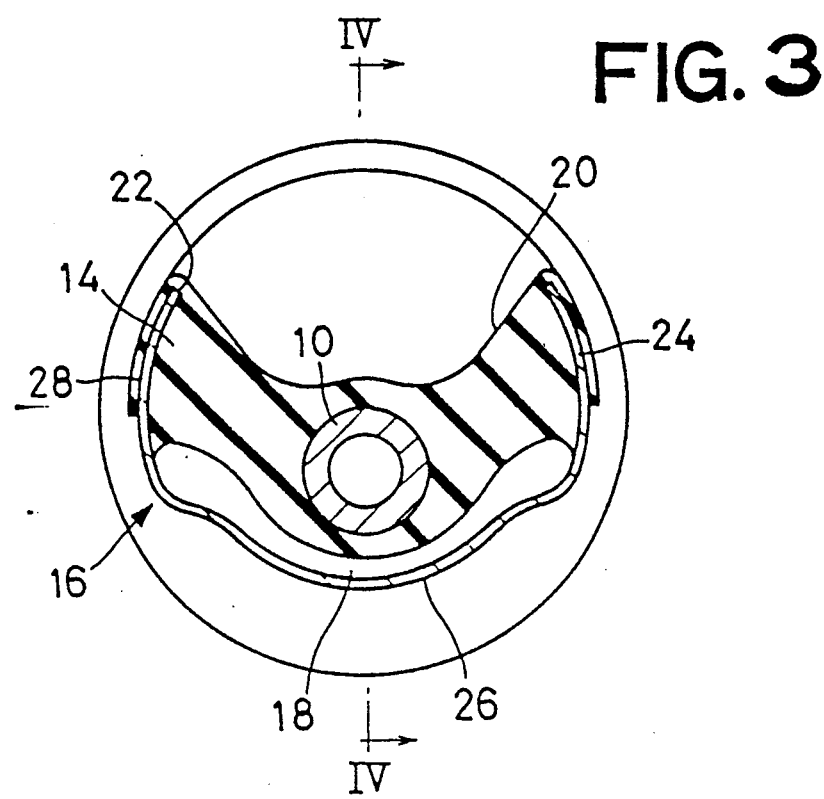
FIG. 3 is a transverse cross sectional view of an inner assembly of the engine mount of FIG. 1, which is produced as an intermediate product by vulcanizing a rubber material to form an elastic body secured to other inner members of the mount.
Figure 4:
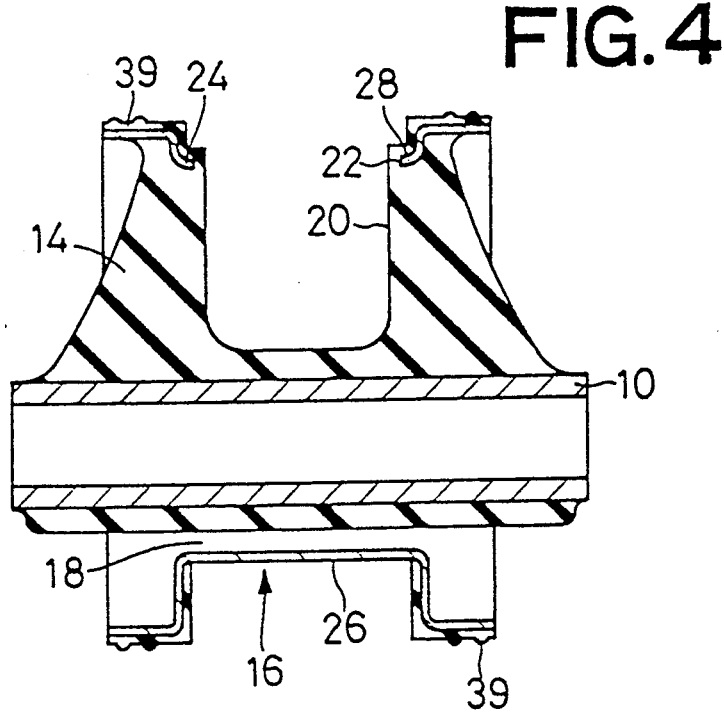
FIG. 4 is a cross sectional view taken along line IV—IV of FIG. 3.

The inner sleeve 10 is a cylindrical member having a comparatively large cylindrical wall thickness. Radially outwardly of this inner sleeve 10, there is disposed a relatively thin-walled, generally cylindrical metallic sleeve 16, such that the metallic sleeve 16 is eccentric with respect to the inner sleeve 10, by a suitable radial distance. Namely, the metallic sleeve 16 is substantially concentric with the outer sleeve 12. The inner sleeve 10, metallic sleeve 16 and elastic body 14 cooperate to constitute an inner assembly of the engine mount, as shown in FIGS. 3 and 4. This inner assembly is prepared as an intermediate product during manufacture of the engine mount, by vulcanizing an unvulcanized rubber material in a suitable mold, to form the elastic body 14 secured to the outer circumferential surface of the inner sleeve 10 and to the inner circumferential surface of the metallic sleeve 16.

The elastic body 14 has an axial void 18 formed through one of diametrically opposite circumferential portions thereof at which the radial distance between the inner sleeve 10 and the metallic sleeve 16 is the shortest. The axial void 18 is formed through the entire axial length of the elastic body 14, and has a generally arcuate cross sectional shape as indicated in FIG. 1, with a suitable circumferential length along the inner circumferential surface of the metallic sleeve 16. In the presence of the arcuate axial void 18, the elastic body 14 is elastically deformable primarily in its portion corresponding to a circumferential portion of the inner sleeve 10 which is remote from the axial void 18 and at which the radial distance between the inner and outer sleeves 10, 12 is comparatively large. The arrangement and configuration of the elastic body 14 indicated above assures a reduced amount of tensile strain in the elastic body when the engine mount is installed in position such that the elastic body 14 is elastically deformed by the static load, i.e., the weight of the power unit which acts on the engine mount so as to cause relative displacement of the inner and outer sleeves 10, 12, as described above.

The elastic body 14 further has a pocket 20 formed in its circumferential portion which is positioned opposite to the axial void 18 in the load-receiving direction of the engine mount. In other words, the pocket 20 is formed in a circumferential portion of the elastic body 14 which corresponds to the circumferential portion of the inner sleeve 10 at which the radial distance between the inner sleeve 10 and the metallic sleeve 16 is the largest. The metallic sleeve 16 has a window 22 aligned with the opening of the pocket 20 formed in the elastic body 14, so that the pocket 20 is open on the outer circumferential surface of the inner assembly of FIGS. 3 and 4, through the window 22.

The metallic sleeve 16 has an axially intermediate small-diameter portion 24 whose mean diameter is smaller than that of the axially opposite end portions. The small-diameter portion 24 defines a deep part-circumferential groove 26 and a pair of shallow part-circumferential grooves 28. The shallow groove 28 is formed by deep drawing technique, over a circumferential portion of the metallic sleeve 16 at which the radial distance to the inner sleeve 10 is relatively small. The deep groove 26 partially defines the axial void 18. The shallow part-circumferential grooves 28 are formed so as to connect the opposite circumferential ends of the deep groove 26 to the window 22.

Figure 5:
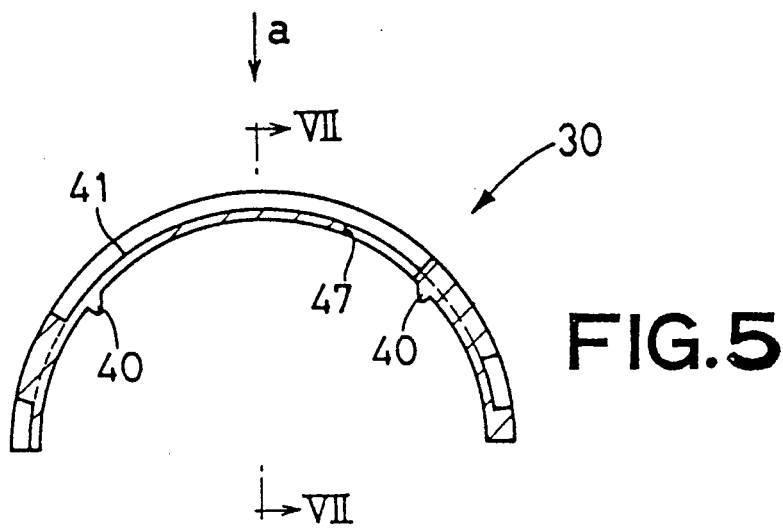
FIG. 5 is a transverse cross sectional view of a first orifice-defining metal member used in the engine mount of FIG. 1.
Figure 8:
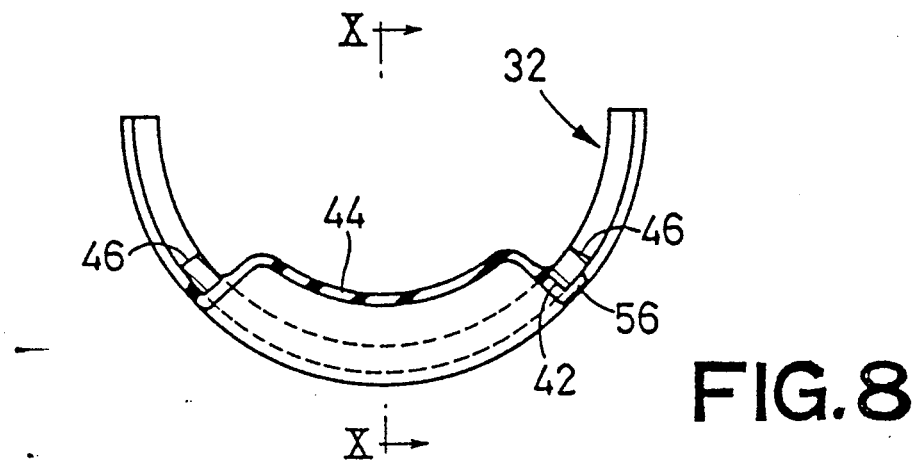
FIG. 8 is a transverse cross sectional view of a second orifice-defining metal member used in the engine mount of FIG. 1.

The thus constructed inner assembly of FIGS. 3 and 4 consisting of the inner sleeve 10, metallic sleeve 16 and elastic body 14 is radially inwardly compressed at the metallic sleeve 16, as needed, so as to give a suitable degree of preliminary compression to the elastic body 16. Subsequently, a first and a second orifice-defining member 30, 32 in the form of substantially semicircular metallic members as illustrated in FIGS. 5 and 8 are positioned in the deep and shallow part-circumferential grooves 26, 28, such that the two semicircular orifice-defining members 30, 32 are disposed in contact with each other in the load-receiving direction, so as to form a circular orifice-defining structure, as indicated in FIGS. 1 and 2. Then, the outer sleeve 12 is fixed fitted on the outer circumferential surface of the metallic sleeve 16.

With the outer sleeve 12 mounted on the inner assembly of FIGS. 3 and 4, the pocket 20 is closed by the outer sleeve 12, whereby an enclosed pressure-receiving chamber 36 corresponding to the pocket 20 is defined by the outer sleeve 12 and the elastic body 14. The outer sleeve 12 also closes the opening of the deep part-circumferential groove 26 of the metallic sleeve 16, whereby a space 38 corresponding to the deep groove 26 is defined by the outer sleeve 12 and the deep groove 26 of the metallic sleeve 16. It is noted that the metallic sleeve 16 as well as the metallic outer sleeve 12 is a rigid member as distinguished from a flexible diaphragm 44 (which will be described) disposed in the space 38 defined by the sleeves 12, 16. To obtain fluid tightness between the outer sleeve 12 and the metallic sleeve 16, sealing rubber layers 39 are formed integrally on the axially end portions of the outer surface of the metallic sleeve 16, so that the rubber layers 39 are held in pressing contact with the corresponding axially end portions of the outer sleeve 12.

Figure 6:
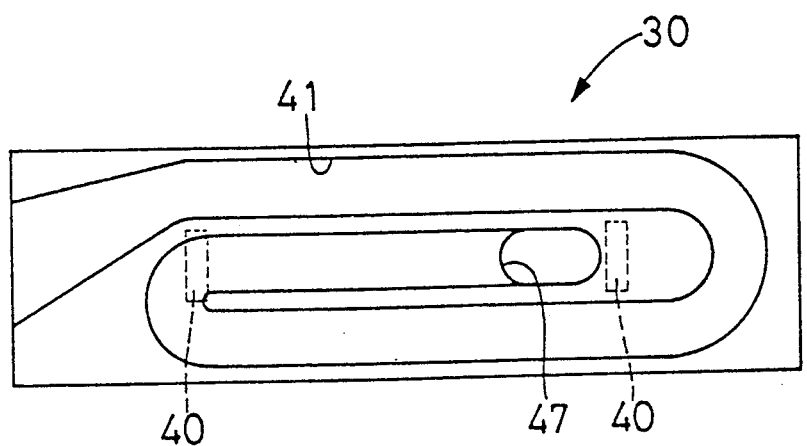
FIG. 6 is a view as seen in the direction indicated by arrow 'a' in FIG. 5.
Figure 7:
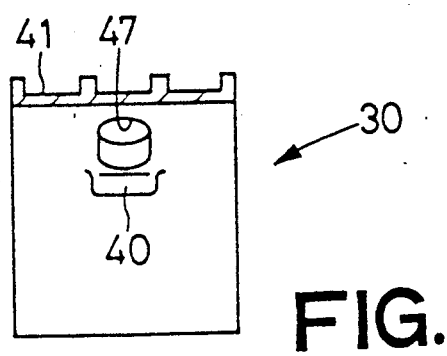
FIG. 7 is a cross sectional view taken along line VII—VII of FIG. 5.

As shown in FIGS. 5-7, the first orifice-defining member 30 disposed on the side of the pocket 20 (pressure-receiving chamber 36) has positioning tabs 40 protruding from the inner surface so that the tabs 40 engage the circumferentially opposite edges of the pocket 20 and window 22, for positioning the member 30 with respect to the elastic body 14 and metallic sleeve 16. The first orifice-defining member 30 also has a generally spiral groove 41 formed in its outer surface. This groove 41 originates at its one end from an axially and circumferentially central portion of the semicircular member 30, and extends spirally in the outer area, such that the spiral groove 42 terminates at the other end at one of the circumferential ends of the orifice-defining member 30.

The first orifice-defining member 30 has a communication hole 47 for communication between the above-indicated one end of the spiral groove 41 and the pressure-receiving chamber 36. With the spiral groove 41 closed by the outer sleeve 12, there is defined a spirally formed orifice passage 48 which communicates at one end thereof with the pressure-receiving chamber 36 through the communication hole 47. The other end of the orifice passage 48 is located at the above-indicated one circumferential end of the first orifice-defining member 30.

Figure 9:
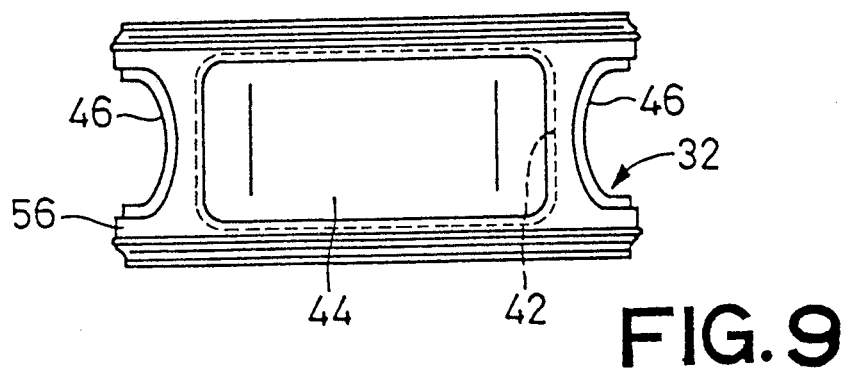
FIG. 9 is a bottom view of the second orifice-defining metal member of FIG. 8.
Figure 10:
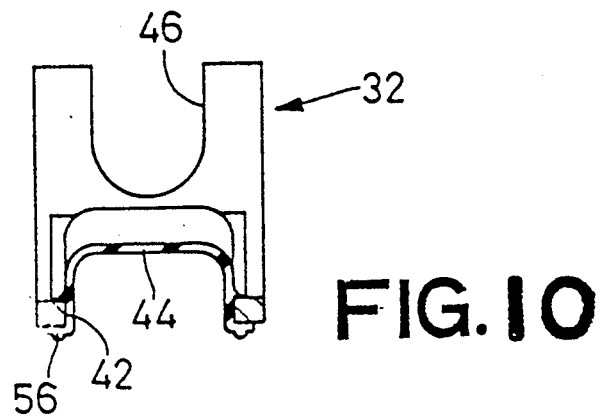
FIG. 10 is a cross sectional view taken along line X—X of FIG. 8.

The second orifice-defining member 32 principally engaging the deep part-circumferential groove 26 of the metallic sleeve 16 has a generally rectangular cutout 42 formed in a central portion thereof, as shown in FIGS. 8-10, such that the longitudinal opposite ends of the cutout 42 are located adjacent to the corresponding ends of the shallow part-circumferential grooves 24. This cutout 42 is closed by a partition member in the form of a flexible diaphragm 44 which is easily elastically deformable or yieldable. The diaphragm 44 is formed on the inner side of the second orifice-defining member 32, and secured by vulcanization at its outer periphery to the edge portions of the member 32 which define the rectangular cutout 42.

As shown in FIGS. 1 and 2, the space 38 is divided by the diaphragm 44 into two sections, i.e., an equilibrium chamber 50 on the side of the metallic sleeve 16, and an air space 52 on the side of the outer sleeve 12. The equilibrium chamber 50 is defined by the deep part-circumferential groove 26 of the sleeve 16 and the diaphragm 44, such that the volume of the equilibrium chamber 50 is variable due to elastic deformation or displacement of the diaphragm 44, whereby a pressure within the chamber 50 may be maintained substantially constant. The air space 52 is defined by the outer sleeve 12 and the diaphragm 44, so that the space 52 permits the elastic deformation, displacement or expansion of the diaphragm 44, thereby permitting variation in the volume of the equilibrium chamber 50.

The second orifice-defining member 32 also has a pair of part-circumferential slots 46 extending from the opposite circumferential ends thereof to the portions near the longitudinal ends of the rectangular cutout 42. These slots 46 are closed at its inner opening by the outer surface of the bottom wall of the small-diameter portion 24 of the metallic sleeve 16, and at its outer opening by the inner surface of the outer sleeve 12. A connecting passage 54 is defined by the second orifice-defining member 32, metallic sleeve 16 and outer sleeve 12, such that the connecting passage 54 communicates at one end with the equilibrium chamber 50, and at the other end with the end of the orifice passage 48 described above. However, only one of the two part-circumferential slots 46 is utilized to provide the connecting passage 54. In this arrangement, an orifice for restricted fluid communication between the pressure-receiving chamber 36 and the equilibrium chamber 50 is provided by the orifice passage 48, and the connecting passage 54 which communicates with the orifice passage 48 and the equilibrium chamber 50.

Although only one of the two slots 46 is used to define the connecting passage 54 communicating with the orifice passage 48, as described above, the second orifice-defining member 32 is provided with the two slots 46 formed on both sides of the rectangular cutout 42, from the standpoint of assembling ease of the member 32. The outer surface of the second orifice-defining member 32 is substantially entirely covered by a sealing rubber layer 56, to secure fluid tightness of the equilibrium chamber 50 and connecting passage 54.

The pressure-receiving chamber 36 and the equilibrium chamber 50 are filled with a suitable non-compressible fluid having a relatively low viscosity. The filling of the chambers 36, 50 may be conducted by mounting the outer sleeve 12 on the inner assembly of FIGS. 3 and 4, within a mass of the selected fluid contained in a suitable vessel. For a sufficient degree of fluidity of the fluid, the kinematic viscosity of the fluid is preferably not higher than 500 centistokes, and more preferably not higher than 100 centistokes. For example, the non-compressible fluid is suitably selected from the group which includes water, ethylene glycol, propylene glycol, other alkylene glycols, low-viscosity polyalkylene glycol, low-viscosity silicone oil, and mixtures thereof.

Figure 12:
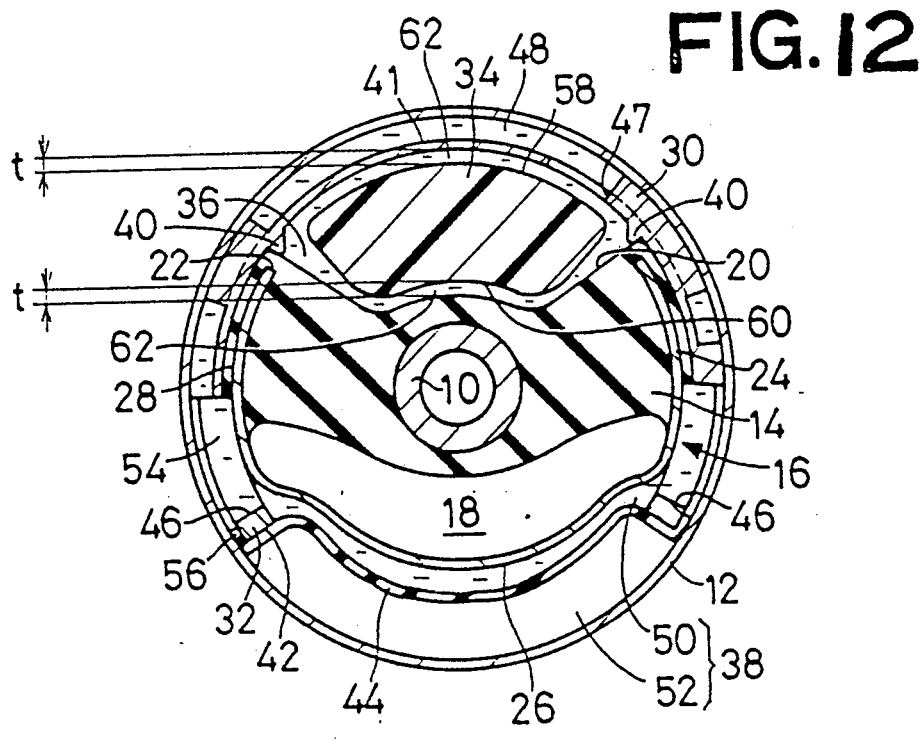
FIG. 12 is a transverse cross sectional view of the engine mount when it is subjected to a vibrational load.

When the inner assembly and the outer sleeve 12 are assembled into the engine mount, a movable member in the form of a movable block 34 is accommodated in the pressure-receiving chamber 36. As shown in FIG. 12, the movable block 34 has opposite arcuate surfaces 58, 60 which follow the facing inner surfaces of the pressure-receiving chamber 36, when the engine mount is installed in position with the weight of the power unit of the vehicle acting on the outer sleeve 12. The lengths of the arcuate surfaces 58, 60 are slightly smaller than those of the facing arcuate inner surfaces of the chamber 36. The movable block 34 is dimensioned so that the block 34 is freely movable within the chamber 36 by a suitable distance, as described below in greater detail.

The movable block 34 used in the present engine mount is formed of a suitable synthetic resin, and normally rests on the bottom wall of the chamber 36, as indicated in FIG. 11, when the engine mount is installed. In other words, the movable block 34 is normally placed in its lowest position.

In the engine mount constructed as described above, a vibrational load applied between the inner and outer sleeves 10, 12 will cause elastic deformation of the elastic body 14, thereby inducing a periodic change in the pressure within the pressure-receiving chamber 36, whereby the fluid is forced to flow between the pressure-receiving and equilibrium chambers 36, 50 through the orifice passage 48 (orifice 48, 54). The length and cross sectional area of the orifice passage 48 are dimensioned so as to effectively damp the vibrations such as engine shake and bounce, whose frequency is in the neighborhood of 10 Hz. That is, the orifice passage 48 is tuned so that the input vibrations in a predetermined frequency range whose center is about 10 Hz can be excellently damped by resonance of the fluid flowing through the orifice passage. Thus, the present engine mount exhibits excellent damping characteristic with respect to the low-frequency vibrations.

In connection with the tuning of the orifice passage 48 for the low-frequency vibrations, it is noted that the spiral configuration of the passage 48 makes it easy to give the passage 48 a sufficient length, which in turn permits a relatively large cross sectional area of the passage 48. This results in a relatively large amount of flow of the fluid through the orifice passage 48, and an increased effect of damping the low-frequency vibrations based on the resonance of the fluid mass in the orifice passage 48.

In the instant engine mount, flows of the fluid occur also in the pressure-receiving chamber 36 when the vibrational load is applied between the inner and outer sleeves 10, 12. As a result, the movable block 34 accommodated in the pressure-receiving chamber 36 is lifted up from the bottom wall of the chamber, as indicated in FIG. 12. Consequently, there are formed fluid passages between the outer periphery of the movable block 34 and the inner surfaces of the pressure-receiving chamber 36, so that the fluid may flow through the fluid passages in response to a volumetric and dimensional change of the pressure-receiving chamber 36 due to elastic deformation of the elastic body 14 by the applied vibrations. For example, the outer and inner arcuate surfaces 58, 60 of the movable block 34 cooperate with the corresponding arcuate surfaces of the pressure-receiving chamber 36 to define two arcuate fluid resonance passages 62, 62 whose thicknesses are indicated at 't' in FIG. 12. These fluid resonance passages 62 extend in the circumferential direction of the engine mount, and is substantially perpendicular to the load-receiving direction (vertical direction as seen in FIGS. 11 and 12). Upon application of the vibrational load between the inner and outer sleeves 10, 12, the thicknesses 't' of the fluid resonance passages 62 vary, and the fluid masses existing in the pressure-receiving chamber 36 are forced to flow through the resonance passages, in both the circumferential and axial directions of the engine mount. The fluid flows through the resonance passages 62 occur periodically in response to the periodic volumetric change of the pressure-receiving chamber 36, and contribute to lowering the dynamic spring constant of the engine mount owing to the resonance of the fluid masses flowing through the resonance passages 62.

It will be understood that the fluid flows through the resonance passages 62 cause flows of the fluid through gaps between the opposite ends of the movable block 34 as viewed in the axial direction of the mount and the opposite axial end surfaces of the pressure-receiving chamber 36, as seen in FIG. 2. The resistance to the fluid flows within the pressure-receiving chamber 36 may be suitably controlled by adjusting the size of the gaps indicated above.

The frequency range of the vibrations that can be effectively isolated by the fluid flows through the pressure-receiving chamber 36 can be suitably determined by adjusting the dimensions (thicknesses 't', and axial and arcuate lengths) of the fluid resonance passages 62, so as to tune the resonance frequency of the fluid masses which flow through the resonance passages 62, depending upon the modulus of elasticity (spring constant) of the elastic body 14, weight (specific gravity) of the movable block 34, viscosity of the fluid and other factors, so that the resonance of the fluid flowing through the resonance passages 62 sufficiently lowers the dynamic spring constant of the engine mount, with respect to the desired frequency range of the input vibrations. The resonance frequency of the fluid masses flowing through the resonance passages 62 may be easily set or tuned to relatively high frequencies of vibrations, for example, to a range of about 100–500 Hz. Therefore, the present engine mount may be readily adapted to effectively isolate the high-frequency vibrations such as booming noises which are generated during running of a motor vehicle.

For obtaining an effective degree of the fluid resonance in the resonance passages 62, it is desirable that the dimensions such as the thicknesses 't' of the resonance passages 62 be determined as specified below, for general applications of the engine mount. Namely, the resonance passages 62 are desirably determined so that (a) a maximum distance of movement 'B' (FIG. 11) of the movable block 34 in the load-receiving direction of the engine mount is held within a range of 2–16 mm, preferably, 3–10 mm; (b) a ratio B/A is held within a range of 0.05–0.50, preferably, 0.10–0.40, where 'A' (FIG. 11) represents a radial dimension of the pressure-receiving chamber 36 when the engine mount is installed in position; and (c) a sum of the areas of the outer and inner arcuate surfaces 58, 60 of the movable block 34 which face the respective arcuate surfaces of the chamber 36 is 1000 mm$^2$ or larger, preferably, 2000 mm$^2$ or larger.

It will be understood from the above description that the present engine mount not only provides a high damping effect for the low-frequency vibrations, based on the fluid flows through the orifice passage 48, but also exhibits a sufficiently lowered dynamic spring constant based on the fluid flows through the resonance passages 62 within the pressure-receiving chamber 36, with respect to the high-frequency vibrations which cause the orifice passage 48 to be practically substantially closed and fail to function. Thus, the present engine mount is capable of exhibiting excellent damping and/or isolating characteristics over a wide range of frequency of the input vibrations.

In the present engine mount wherein the orifice passage 48 takes the form of a spiral passage having a sufficiently large length, the low-frequency vibrations may be damped in a highly effective manner.

Further, the present engine mount provides a significant improvement in its capability of isolating the high-frequency vibrations, owing to the movable block 34 which may be readily incorporated in the mount, by simply placing the block 34 in the pressure-receiving chamber 36 (pocket 20) when the engine mount is assembled. The provision of the movable block 34 does not considerably increase the difficulty and cost of manufacture of the mount.

Moreover, the amount of expansion of the flexible diaphragm 44 partially defining the equilibrium chamber 50 of the present engine mount is limited by the outer sleeve 12 partially defining the space 38, whereby the diaphragm 44 is protected from excessive deformation, and is given improved durability.

It is also noted that the movable block 34 in the pressure-receiving chamber 36 also functions as a stop for limiting the amount of relative displacement between the inner and outer sleeves 10, 12, by abutting contact of the movable block 34 with the outer sleeve via the the first orifice-defining member 30, and by abutting contact of the block 34 with the inner sleeve 10 via a relatively thin inner portion of the elastic body 14. The movable block 34 as the stop protects the elastic body 14 from excessive deformation upon application of an excessively large vibrational load to the engine mount.

Referring to FIGS. 13–18, another embodiment of the fluid-filled cylindrical elastic mount of the invention will be described. The same reference numerals as used in FIGS. 1–12 will be used in FIGS. 13–18 to identify the functionally corresponding components, and no redundant description of these components will be given.

This embodiment is identical with the preceding embodiment, except for the provision of an elastic stop in the form of a rubber stop 29. This rubber stop 25 is formed on and secured to an arcuate inner surface of the bottom wall of the metallic sleeve 16 whose outer surface defines the deep part-circumferential groove 26. This rubber stop 29 is accommodated in the axial void 18 and has a suitable thickness as measured substantially in the radial direction of the engine mount. In other words, the rubber stop 29 partially defines the axial void 18.

Figure 15:
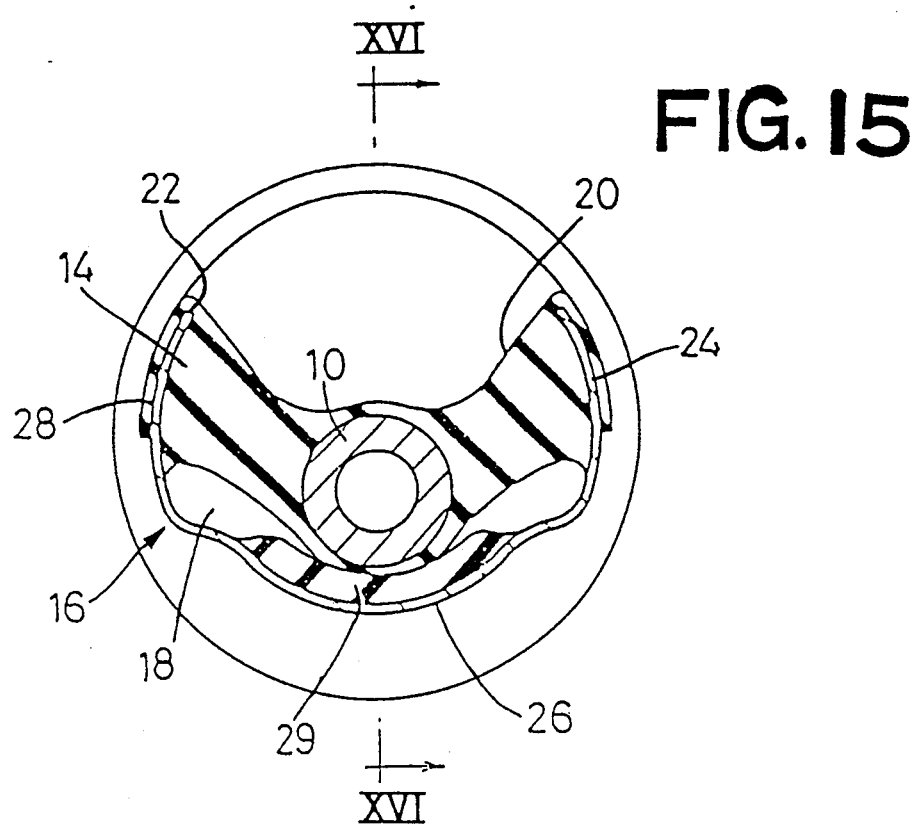
FIG. 15 is a view corresponding to that of FIG. 3, illustrating an inner assembly of the engine mount of FIG. 13.
Figure 16:
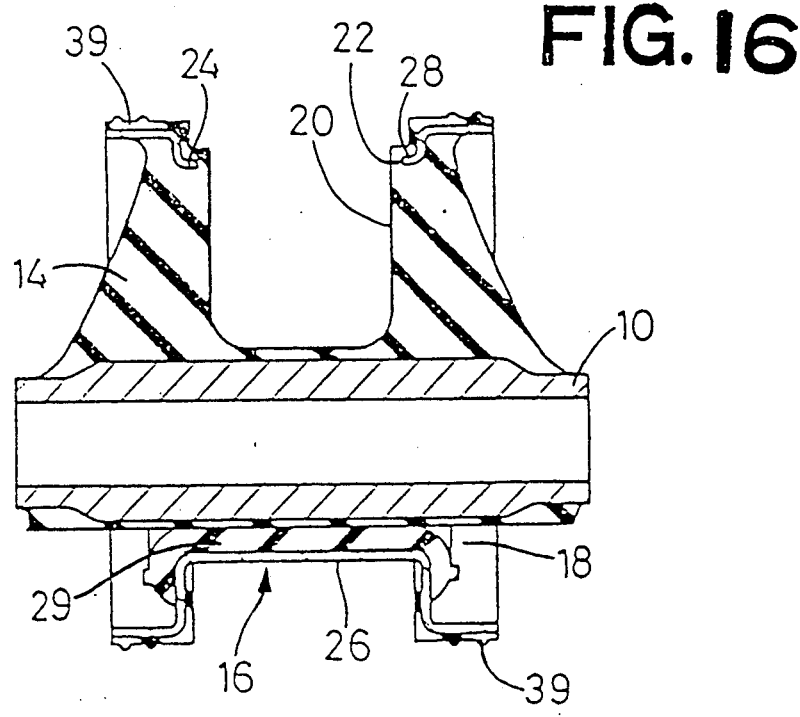
FIG. 16 is a cross sectional view taken along line XVI—XVI of FIG. 15.

The rubber stop 29 may be made of the same rubber material as the elastic body 14. In this case, the rubber stop 29 can be formed when the elastic body 14 is formed by vulcanization in a mold, with the inner and metallic sleeves 10, 16 suitably positioned in the mold. However, the rubber stop 29 may be made of a rubber material different from that of the elastic body 14. In this case, the elastic body 14 and the rubber stop 29 may be adapted to exhibit different spring characteristics. In the present embodiment, the inner assembly of the engine mount as shown in FIGS. 15 and 16 includes the rubber stop 29.

Figure 17:
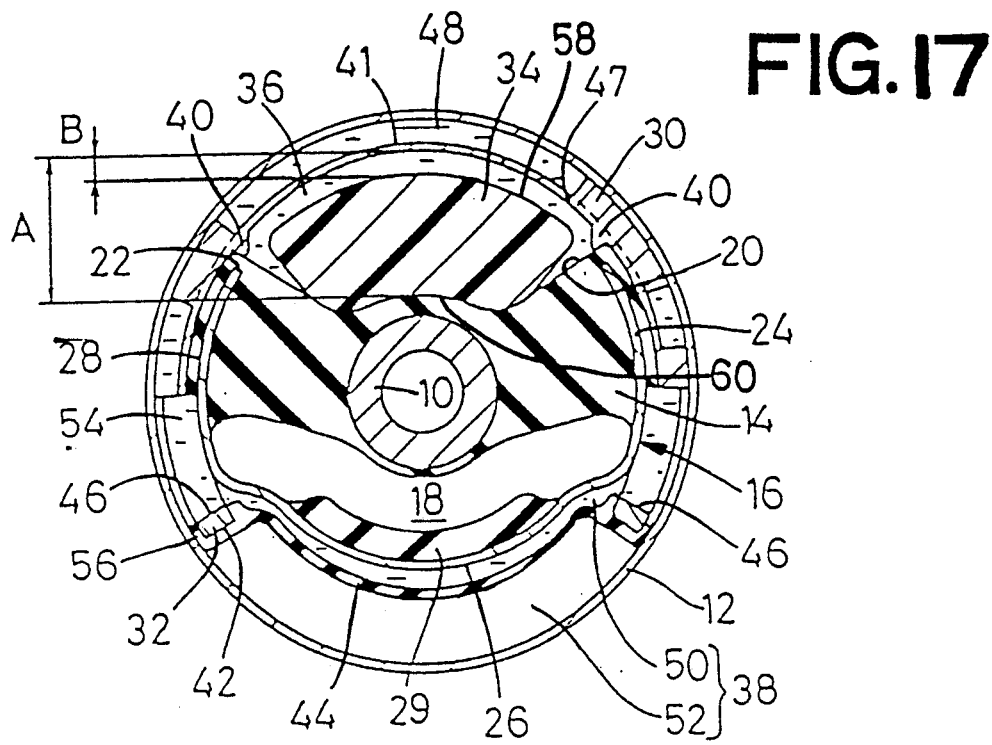
FIGS. 17 and 18 are views corresponding to those of FIGS. 11 and 12, showing the engine mount of FIG. 13.
Figure 18:
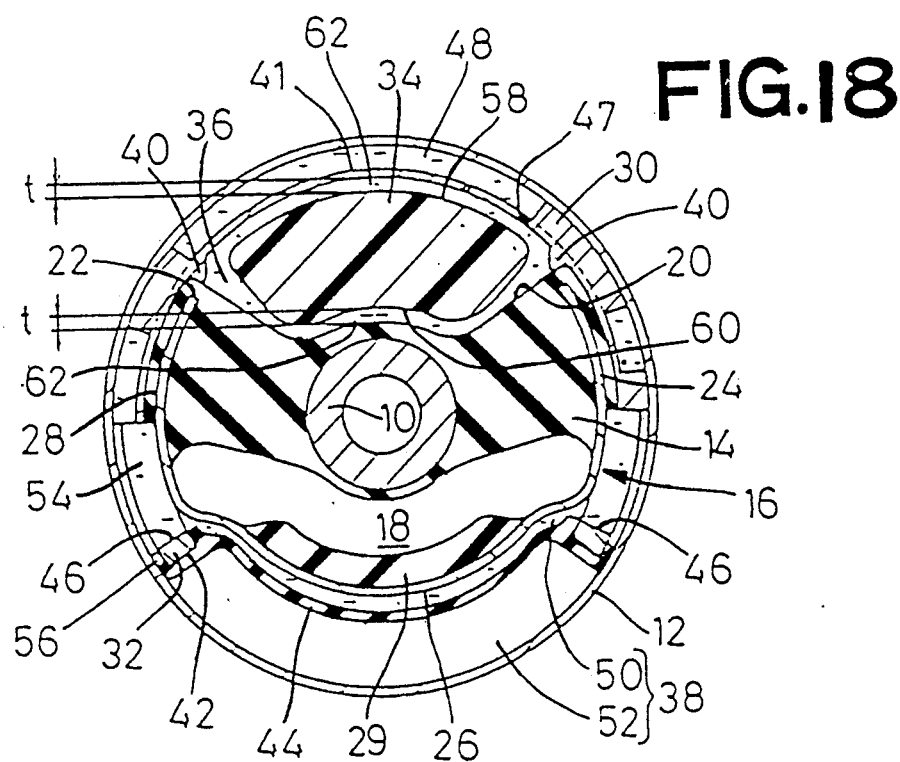

When the present engine mount is installed in position as shown in FIGS. 17 and 18, the rubber stop 29 formed on the bottom wall of the deep part-circumferential groove 26 of the metallic sleeve 16 faces the outer circumferential surface of the inner sleeve 10 via a thin layer of the elastic body 14, such that the rubber stop 29 is spaced from the inner sleeve 10 by a predetermined distance in the load-receiving direction of the engine mount.

When an excessively large vibrational load is applied between the inner and outer sleeves 10, 12, an excessive amount of relative displacement of the sleeves 10, 12 in the bounding direction is prevented by abutting contact of the sleeves 10, 12 via the movable block 34. Further, an abutting contact of the rubber stop 29 with the inner sleeve 10 prevents an excessive amount of relative displacement of the two sleeves 10, 12 in the rebounding direction.

In the present embodiment, the rubber stop 29 disposed in the axial void 18 as a second stop provides an added effect of preventing an excessive displacement of the power unit relative to the car body, and protecting the elastic body 14 from excessive deformation to thereby increase its durability.

While the present invention has been described in detail in its presently preferred embodiments, for illustrative purpose only, it is to be understood that the invention is not limited to the details of the illustrated embodiments.

For example, the material, configuration and dimensions of the movable block 34 are not limited to those of the illustrated embodiments. The movable block 34 may be made of any relatively rigid material such as an aluminum alloy or stainless steel, depending upon the specific gravity of the fluid and other factors. Further, the movable block 34 may have rectangular, columnar and any other desired shape, which is determined depending upon the configuration of the pressure-receiving chamber 36.

Further, the movable block 34 may be a hollow member, and may be designed to float on a mass of the selected non-compressible fluid, depending upon the specific gravity of the fluid. In the latter case, however, the movable block 34 is submerged in the fluid mass in the pressure-receiving chamber 36, in spaced-apart relation from the inner sleeve 10 when the engine mount is installed in position.

Figure 13:
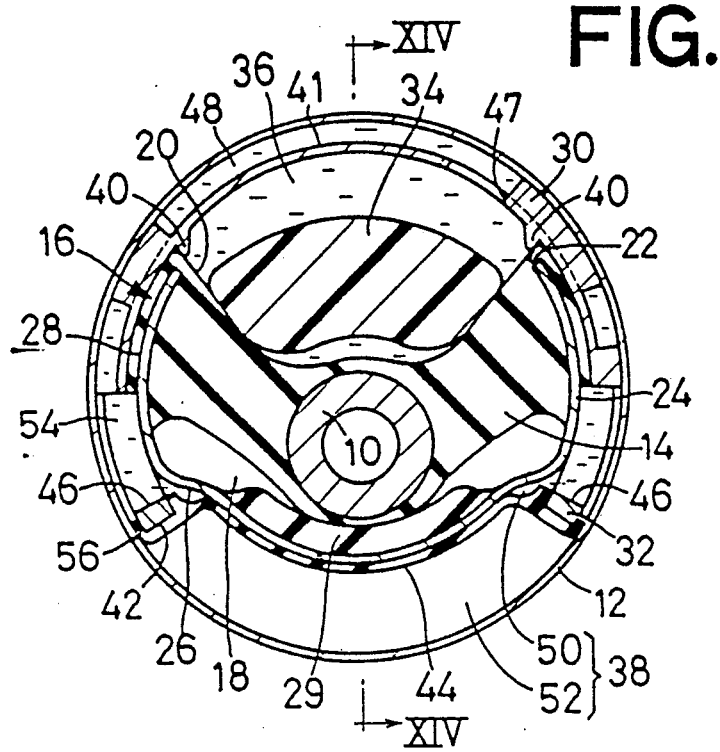
FIG. 13 is a view corresponding to that of FIG. 1, showing another embodiment of the invention.
Figure 14:
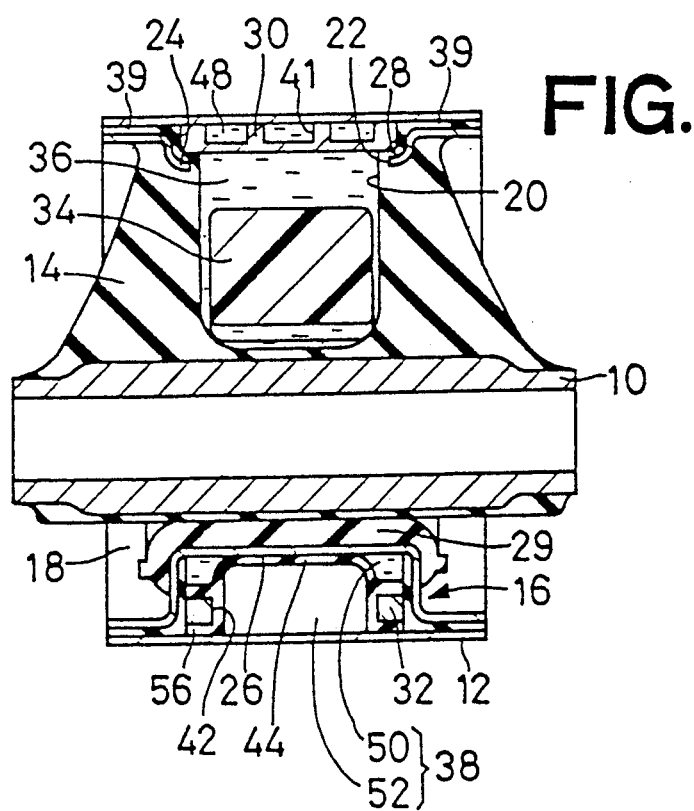
FIG. 14 is a cross sectional view taken along line XIV—XIV of FIG. 13.

Although the illustrated engine mounts of FIGS. 1–2 and FIGS. 13–14 are adapted so that the weight of the power unit of the vehicle acts on the outer sleeve 12, the engine mount of the present invention may be modified so that the engine mount is installed such that the weight of the power unit acts on the inner sleeve 10. In this case, the center of the inner sleeve 10 is offset with respect to that of the outer sleeve 12, in the upward direction (as seen in FIGS. 1 and 13), so that the inner and outer sleeves 10, 12 are concentric with each other when the engine mount is installed with the inner sleeve 10 receiving the static load of the power unit.

The equilibrium chamber 50 in the space 38 may be defined between the diaphragm 44 and the outer sleeve 12. In this case, the air chamber 52 for allowing the diaphragm 44 to expand is defined between the diaphragm 44 and the metallic sleeve 16. It is also possible to use an elastic thin-walled bag accommodated in the space 38, so that the bag is used as an equilibrium chamber.

While the metallic sleeve 16 functions as a rigid member to cooperate with the outer sleeve 12 to define the space 38, a rigid member separate from the metallic sleeve 16 may be provided to partially define the space 38. In this case, the rigid member is built in the inner assembly of the mount, after the elastic body 14 is formed by vulcanization such that the elastic body 14 is secured to the metallic sleeve 16.

The space 38 need not be a fluid-tight enclosure, provided that the equilibrium chamber 50 is fluid-tight and that the amount of deformation of the diaphragm 44 is limited by some suitable means.

While the sealing rubber layers 39, 56 are formed on the outer surfaces of the metallic sleeve 16 and second orifice-defining member 32 to secure fluid tightness with respect to the outer sleeve 12, these sealing rubber layers may be formed on the inner surface of the outer sleeve 12.

Although the illustrated embodiments are adapted to be used as engine mounts for a motor vehicle, the concept of the invention may be embodied as vehicle suspension bushings, and other fluid-filled elastic mounts whose applications are not limited to the motor vehicle.

It is to be understood that the present invention may be embodied with various other changes, modifications and improvements, which may occur to those skilled in the art, without departing from the spirit and scope of the invention defined in the following claims.

What is claimed is:

1. A fluid-filled cylindrical elastic mount comprising:
    an inner and an outer sleeve which are disposed in spaced-apart relation with each other in a radial direction of the mount;
    an elastic body interposed between said inner and outer sleeves for flexible connection therebetween, and having a pocket open in an outer surface thereof and an axial void formed therethrough over an entire length thereof in an axial direction of the mount, said pocket and said axial void being formed in respective diametrically opposite portions of said elastic body which are opposite to each other in a load-receiving direction in which the mount primarily receives a vibrational load;

said elastic body and said outer sleeve at least partially defining a pressure-receiving chamber such that said pocket is closed by said outer sleeve, said pressure-receiving chamber being filled with a non-compressible fluid, a pressure of said fluid in said chamber varying upon application of said vibrational load to the mount;

a movable member accommodated in said pressure-receiving chamber freely movable over a predetermined distance in said load-receiving direction, said movable member defining a fluid resonance portion with respect to an inner surface of said pressure-receiving chamber;

a rigid member disposed in said axial void, fixedly to said outer sleeve, and cooperating with said outer sleeve to define a space therebetween;

a partition member disposed in said space so as to divide said space into two sections one of which acts as an equilibrium chamber filled with said non-compressible fluid, said partition member including a flexible film portion which is elastically deformable so as to change a volume of said equilibrium chamber for maintaining said fluid in said equilibrium chamber at a substantially constant pressure;

an orifice-defining member disposed on the outer surface of said elastic body, and having an arcuate portion which covers at least an opening of said pocket, said arcuate portion having a spiral groove formed in an outer surface thereof, and a communication hole formed in communication with an inner end of said spiral groove and said pressure-receiving chamber;

said outer sleeve closing said spiral groove, and thereby forming an orifice passage which communicates at one end thereof with said pressure-receiving chamber through said communication hole, and at the other end thereof corresponding to an outer end of said spiral groove with said equilibrium chamber.

2. A fluid-filled cylindrical elastic mount according to claim 1, further comprising an elastic stop secured to an inner surface of said rigid member such that said elastic stop protrudes in said axial void, in facing relation with said inner sleeve in said load-receiving direction.

3. A fluid-filled cylindrical elastic mount according to claim 2, wherein said rigid member includes a small-diameter portion which has a part-circumferential groove which is open in a radially outward direction of the mount, said elastic stop being formed on an inner surface of a bottom wall of said small-diameter portion which defines said part-circumferential groove.

4. A fluid-filled cylindrical elastic mount according to claim 1, further comprising another orifice-defining member which cooperates with said outer sleeve to define a connecting passage which communicates at one end thereof with said one end of said orifice passage and at the other end thereof with said equilibrium chamber.

5. A fluid-filled cylindrical elastic mount according to claim 4, wherein said another orifice-defining member has a cutout formed in a portion thereof which faces an outer surface of said rigid member, said flexible film portion of said partition member being secured to said portion of said another orifice-defining member so as to cover said cutout, said flexible film portion cooperating with said rigid member to define said equilibrium chamber.

6. A fluid-filled cylindrical elastic mount according to claim 5, wherein said outer sleeve and said flexible film portion of said partition member cooperate to define an air chamber as the other of said two sections of said space, said air chamber allowing said flexible film portion to expand so as to increase a volume of said equilibrium chamber.

7. A fluid-filled cylindrical elastic mount according to claim 1, wherein said movable member has an outer arcuate surface substantially following an arc of said outer sleeve, and an inner arcuate surface substantially following a radially inner surface of said pressure-receiving chamber near said inner sleeve.

8. A fluid-filled cylindrical elastic mount according to claim 7, wherein said predetermined distance of movement of said movable member is held within a range of 2–16 mm.

9. A fluid-filled cylindrical elastic mount according to claim 7, wherein a ratio of said predetermined distance to a radial dimension of said pressure-receiving chamber in said load-receiving direction is held within a range of 0.05–0.50.

10. A fluid-filled cylindrical elastic mount according to claim 7, wherein a sum of areas of said outer and inner arcuate surfaces of said movable member is not smaller than 1000 $mm^2$.

11. A fluid-filled cylindrical elastic mount according to claim 1, wherein said non-compressible fluid has a kinematic viscosity of not higher than 500 centistokes.

12. A fluid-filled cylindrical elastic mount according to claim 1, wherein axes of said inner and outer sleeves are offset from each other so that said inner and outer sleeves are coaxial with each other when the mount is installed in position, with a static load acting on one of said inner and outer sleeves.

* * * * *